United States Patent [19]

Sahara et al.

[11] 4,149,786
[45] Apr. 17, 1979

[54] CAMERA EXPOSURE TIME CONTROL CIRCUITRY

[75] Inventors: Masayoshi Sahara, Sennan; Motonobu Matsuda, Kawachinagano, both of Japan

[73] Assignee: Minolta Camera Kabushiki Kaisha, Osaka, Japan

[21] Appl. No.: 837,754

[22] Filed: Sep. 29, 1977

[30] Foreign Application Priority Data

Oct. 16, 1978 [JP] Japan .................. 51-124135

[51] Int. Cl.² ............................ G03B 7/08
[52] U.S. Cl. .............................. 354/51
[58] Field of Search ............ 354/24, 50, 51, 60 R; 307/246

[56] References Cited

U.S. PATENT DOCUMENTS 3,977,011  8/1976  Matsuda .................. 354/24
4,069,489  1/1978  Matsuda .................. 354/51

Primary Examiner—L. T. Hix
Assistant Examiner—William B. Perkey
Attorney, Agent, or Firm—Watson, Cole, Grindle & Watson

[57] ABSTRACT

Control circuitry controls exposure time in accordance with a light representative signal that has been stored in a storing device through a storing switch from a light measuring circuit which includes a photocell receiving scene light through the camera objective. The storing switch includes an emitter follower transistor circuit through which the light representative signal is transmitted from the light measuring circuit to the storing device, and which is turned off in response to actuation of a switch adapted for energization of the shutter control magnet. Constant current sources ensure temperature stabilization of the emitter-follower circuit such that the voltage stored by the storing device accurately represents the output of the light measuring circuit.

7 Claims, 4 Drawing Figures

CAMERA EXPOSURE TIME CONTROL CIRCUITRY

BACKGROUND OF THE INVENTION

1. Field of the Invention

The present invention relates to camera exposure time control circuitry and more particularly pertains to such control circuitry of the type in which a signal representative of scene brightness, measured through a camera objective, is stored in a storing device for controlling exposure time in accordance with the stored signal.

2. Description of the Prior Art

In a camera in which scene brightness is measured by a photocell through a camera objective (TTL light measuring type) and the photocell is blocked from scene light while the shutter is in operation, it is necessary to store the result of such light measurement carried out prior to the shutter operation, so that the shutter is controlled automatically in accordance with the stored signal. This TTL-light-measuring and signal-storing type exposure time control system is well known in the art, for example as shown in USP at Nos. 3,815,148, 3,733,984 and 3,977,011.

FIG. 1 schematically illustrates such an exposure control circuit of the TTL-light-measuring and measured-value-storing type. In the Figure, circuit A generates an output signal representative of an exposure time suitable for given exposure conditions, e.g. measured scene brightness, set diaphragm aperture value and set film sensitivity value, in accordance with a electrical calculation using signals corresponding to the set values and a signal commensurate with the scene brightness. The output signal of the circuit A is stored in a storing capacitor Cm in the form of voltage through a storing switch S3. Circuit B controls exposure time in accordance with the signal stored in the capacitor Cm in the manner that the circuit B deenergizes an electromagnet Mg to initiate shutter closing after a lapse of a time period dependent on the stored signal.

At an initial stage of the camera photographing operation, the storing switch S3 is closed, with a power switch S1 and an electromagnet energizing switch S2 being open. Upon depression of a shutter release button (not shown), the power switch S1 is closed to energize and actuate the circuit A and the exposure time representative signal from the circuit A is stored in the capacitor Cm through the closed switch S3. When the release button is depressed further, the switch S3 is opened to fix the signal in the capacitor Cm before a reflecting mirror is removed from its viewing position and a diaphragm is stopped down and switch S2 is closed to energize the electromagnet Mg through the circuit B, before shutter opening is initiated in response to the completion of mirror movement and stopping-down of the diaphragm. Then, time counting in the circuit B is commenced simultaneously with actuation of the shutter.

In this prior art circuitry, if the light measuring circuit A has a high output impedance, it takes considerable time for the capacitor Cm to be charged to the output level of the circuit A so that the voltage of the storing capacitor can not quickly follow changes in output of the circuit A, i.e. changes in scene brightness. In this case, the storing capacitor fails to store the scene-light-representative signal properly if the shutter release button is depressed down rapidly without a pause between closing of switch S1 and initiation of the operation of the mirror and diaphragm.

SUMMARY OF THE INVENTION

Accordingly, the primary object of the present invention is to provide an automatic exposure control circuitry of the TTL light measuring type and in which a light representative signal is stored quickly in a storing means.

Another object of the present invention is to provide such an automatic exposure control circuitry having a signal storing means with a high response characteristic.

Still another object of the present invention is to provide such automatic exposure control circuitry in which the output of a light measuring and exposure calculating circuit is stored in a storing capacitor through a semiconductor switching circuit.

A further object of the present invention is to provide an automatic exposure control circuit as mentioned above and which has a construction suitable for being formed in an integrated circuit.

In accordance with the invention an impedance transformation circuit is connected between a light measuring circuit and a storage device, such as for example a capacitor, and includes emitter-follower circuitry which functions as a storage switch and as a low impedance, whereby the storage capacitor is rapidly charged by the output of the light measuring circuit. Semiconductor switching elements associated with the emitter-follower circuit control it in conjunction with the operation of switching elements which are, in turn, actuated by the camera shutter release operation, such that the voltage stored by the capacitor accurately represents the output of the light measuring circuit and actuates exposure control circuitry for controlling known shutter exposure mechanism. Current sources are provided in the emitter-follower circuit to ensure temperature stabilization thereof.

BRIEF DESCRIPTION OF THE FIGURES

These and other objects, advantages, and features of the invention will be apparent from the following description taken in connection with the accompanying drawings wherein.

DETAILED DESCRIPTION OF THE PREFERRED EMBODIMENT

Before the description of the preferred embodiment of the present invention proceeds, it is to be noted that like or corresponding parts are designated by like numerals or symbols throughout the drawings.

Figure 1:
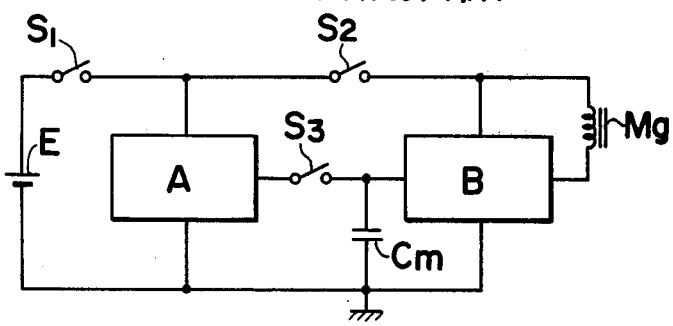
FIG. 1 is a schematic circuit diagram of prior art circuitry.
Figure 2:
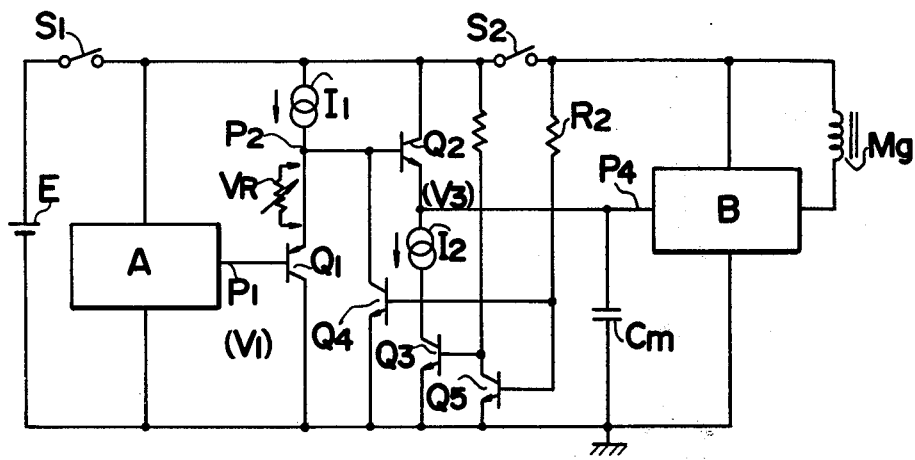
FIG. 2 is a circuit diagram of a preferred embodiment of the present invention.
Figure 3:
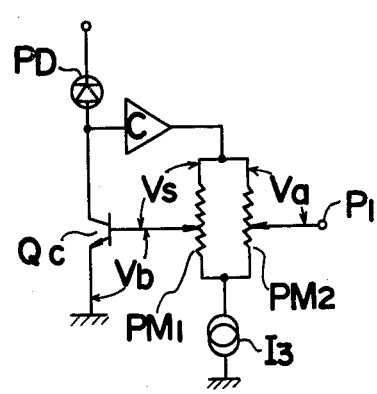
FIG. 3 is a circuit diagram of a light measuring and exposure calculating circuit which may be employed at the portion of block A of FIG. 2.

Referring now to FIG. 2, circuits A and B may have substantially the same construction and perform substantially the same function as those of the conventional circuitry as shown in FIG. 1. For example, the circuit A may be as shown in FIG. 3, wherein a photocell PD, such as a photodiode or photovoltaic cell, is connected with a collector electrode of a transistor Qc, with the junction point therebetween being connected through an operational amplifier C and a part of a potentiometer PM1 to a base electrode of the transistor Qc, so that at the base electrode of the transistor Qc is generated a voltage Vb proportional to a photoelectric current generated by the photocell PD with the potential at the junction point between the photocell and the collector electrode of the transistor Qc being maintained constant. In FIG. 3, two potentiometers PM1 and PM2 are connected in parallel with each other to a constant current source I3. The movable contact of the potentiometer PM1 is adjusted in accordance with film sensitivity setting, while the movable contact of the potentiometer PM2 is adjusted as a function of diaphragm aperture value setting. Accordingly, voltage Vs corresponds corresponds to set film sensitivity, while Va to set diaphragm aperture value. Thus, at the output terminal P1 is produced a voltage V1 as a result of an electric calculation that $V1 = Vb + Vs - Va$. In other words, output voltage V1 corresponds to a shutter speed or an exposure time suitable for measured scene brightness in view of set film sensitivity and diaphragm aperture values.

Figure 4:
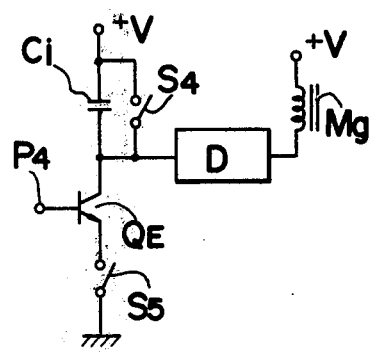
FIG. 4 is a circuit diagram of a timing circuit which may be employed at the portion of block B of FIG. 2.

Further the circuit B may be as shown in FIG. 4, wherein a transistor QE has its collector electrode connected to an integrating capacitor Ci to charge the latter with collector current proportional to the antilogarithm of an input potential P4 which is supplied from the storing capacitor. Switch S4 is closed after shutter operation to discharge the integrating capacitor. Switch S5 is to be closed synchronously with actuation of the shutter to initiate charging of the integrating capacitor. The block diagram D shows a switching circuit which is turned off or made non-conductive to deenergize the electromagnet and initiate shutter closing when the integrating capacitor is charged to a predetermined level.

Referring back to FIG. 2, transistor Q2 serves as an impedance converter and at the same time as a storing switch. That is, as the transistor Q2, being disposed between the circuit A and a storing capacitor Cm, transmits an output of the circuit to the capacitor Cm in the form of an emitter follower construction so that the impedance of the circuit A seen from the side of the capacitor Cm may be low. The transistor Q2 has its emitter electrode connected to the storing capacitor Cm, with the emitter electrode thereof being grounded through a constant current source I2 and emitter-collector of a transistor Q3. The base electrode of the transistor Q2 is connected to the emitter electrode of an emitter-follower transistor Q1 which has its base connected with the output line P1 of the circuit A, with the emitter of the transistor Q1 connected to the positive electrode of a power source battery E through a constant current source I1 and a power switch S1.

Assuming that the potential at P1 is V1, then the potential V3 at the emitter electrode of the transistor Q2 is given as follows:

$$V3 = V1 + Veb1 - Veb2$$

wherein Veb1 and Veb2 are respectively the base-emitter voltages of the transistor Q1 and Q2. As the transistors Q1 and Q2 are supplied with constant current, these base-emitter voltages are equal to each other and $V3 = V1$. However, Veb1 is not necessarily equal to Veb2. Although in the circuitry of FIG. 2, the base electrode of the transistor Q2 is connected indirectly to P1 to compensate for temperature characteristic of the transistor Q2 by the temperature characteristic of the transistor Q1, the transistor Q1 may be removed if the output of the circuit A1 includes the factor of such compensation for the temperature characteristic.

The base electrode of the transistor Q2 is grounded through the collector-emitter of a transistor Q4 which serves to control the conductivity of the transistor Q2 and thus the latter transistor Q2 serves as a storing switch. The constant current source I2 is also grounded through a transistor Q3 the conductivity of which is controlled by a transistor Q5 so that an electric signal stored in the storing capacitor Cm is maintained therein while the transistor Q3 is being blocked. Both base electrodes of transistors Q4 and Q5 are connected through a resistor R2 and the switches S2 and S1 to the positive electrode of the power source E. Accordingly, when the switch S1 is closed with the switch S2 being still open, at the early stage of shutter releasing operation, the transistors Q4 and Q5 are blocked and hence the transistor Q3 becomes conductive so that the output of the circuit A is transmitted through the transistor Q2 to the storing capacitor Cm with the voltage thereof varying substantially instantaneously with changes of output of the circuit A.

When the switch S2 is closed immediately before the reflex mirror is moved away from its viewing position to its photographing position and the diaphragm begins to be stopped down, electric current is fed to the base electrodes of the transistor Q5 and Q4 to make the both transistors Q5 and Q4 conductive, so that the transistor Q2, the base potential of which becomes grounded due to the conductiveness of the transistor Q4, is blocked to disconnect the storing capacitor Cm from the circuit A with the transistor Q3 being blocked to retain the signal in the capacitor Cm.

It is to be noted that a variable resistor VR which is shown near the transistor Q1, may be connected between the point 2 and the emitter electrode of the transistor Q1 so that the voltage appearing across the variable resistor VR, through which constant current from the constant current source I1 flows, may be added to the output of the circuit. The emitter potential of the transistor Q2 may be varied by adjusting the variable resistor, for the purpose of inserting information of the exposure factor, such as set film sensitivity, instead of doing so in the circuit A, or for the compensation for an error of exposure time to be controlled, due to scattering of the capacitance of the integrating capacitor Ci (see FIG. 4).

We claim:
1. Camera exposure control circuitry comprising:
 a first circuit means for generating an output signal representative of an exposure time commensurate with measured scene brightness and set exposure conditions;
 means for storing said output signal;
 a second circuit means for timing shutter closing in accordance with the stored signal;
 an impedance transformation circuit including an emitter-follower circuit having a base responsive to said output signal and an emitter connected to said storing means; and
 means for controlling the operation of said impedance transformation circuit and including a first semiconductor switching element having emitter-collector electrodes and a constant current source connected in series therewith, the series connection being connected between the emitter of said emit- ter follower circuit and a circuit ground, and a switching means actuated by camera shutter release operation to control the conduction and nonconduction of said first semiconductor switching element, whereby said emitter follower circuit is inoperable in response to the camera shutter releasing operation and is operable at other times.

2. Camera exposure control circuitry as in claim 1 wherein
said means for controlling includes a second semiconductor switching element connected between said emitter follower base and ground, said first semiconductor switching element being nonconductive and said second semiconductor switching element being conductive in response to the camera shutter releasing operation and the operation of said first and second semiconductor switching elements being reversed at other times.

3. Camera exposure control circuitry as in claim 1 wherein said impedance transformation circuit further includes a second emitter follower circuit having a base connected to said output signal and an emitter connected to the base of said first emitter follower circuit and a second current source connected to the emitter of said second emitter follower circuit.

4. Camera exposure control circuitry as in claim 3 wherein said means for controlling further includes a third semiconductor switching element having an emitter-collector connected between the base of said first semiconductor or switching element and said circuit ground, the bases of said first and third semiconductor switching elements are respectively connected across said switching means.

5. Camera exposure circuitry as in claim 3 further comprising means for adding a signal representative of additional exposure factor information to said output signal.

6. Camera exposure circuitry as in claim 5 wherein said means for adding is a variable resistance connected between said second current source and the output of said first circuit means.

7. Camera exposure circuitry as in claim 4 further comprising a power source and a power source switch for connecting said power source to said first circuit, said impedance transformation circuit, said means for controlling and a terminal of said switching means; and said power source is connected to said second circuit means through said switching means upon actuation thereof.

* * * * *

UNITED STATES PATENT OFFICE
CERTIFICATE OF CORRECTION

PATENT NO. : 4,149,786
DATED : April 17, 1979
INVENTOR(S) : Sahara et al

It is certified that error appears in the above-identified patent and that said Letters Patent are hereby corrected as shown below:

[30] Foreign Application Priority Data

Oct. 16, 1976 [JP]  Japan .........51-124135

Signed and Sealed this

Twenty-fifth Day of September 1979

[SEAL]

Attest:

LUTRELLE F. PARKER
Attesting Officer   Acting Commissioner of Patents and Trademarks